United States Patent [19]

Pokorski et al.

[11] Patent Number: 4,947,036

[45] Date of Patent: Aug. 7, 1990

[54] SELF-MONITORING OPTICAL SENSOR HAVING A RATIOMETRIC OUTPUT SIGNAL

[75] Inventors: Joseph D. Pokorski, Depew; Geoffrey M. Rhodes, Orchard Park; George W. Tregay, Amherst, all of N.Y.

[73] Assignee: Conax Buffalo Corporation, Buffalo, N.Y.

[21] Appl. No.: 260,600

[22] Filed: Oct. 20, 1988

Related U.S. Application Data

[63] Continuation-in-part of Ser. No. 915,115, Oct. 3, 1986, abandoned.

[51] Int. Cl.⁵ .............................................. G01J 3/50
[52] U.S. Cl. ............................ 250/226.1; 250/227.11; 250/231.1
[58] Field of Search ............ 250/226, 229, 227, 231 R

[56] References Cited

U.S. PATENT DOCUMENTS

| 4,560,868 | 12/1985 | Brogardh et al. | 250/231 R |
| 4,596,925 | 6/1986 | Gilby | 250/231 R |
| 4,703,175 | 10/1987 | Salour et al. | 250/231 R |
| 4,743,119 | 5/1988 | Ida | 250/231 R |
| 4,761,551 | 8/1988 | Edwards et al. | 250/231 R |
| 4,774,407 | 9/1988 | Erbe | 250/227 |

*Primary Examiner*—David C. Nelms
*Attorney, Agent, or Firm*—Sommer, Oliverio & Sommer

[57] ABSTRACT

An optical apparatus for measuring physical quantities, comprising an optical transducer (33) for sensing position, outgoing and return optical fibers (20,23), and an electronic control module (43). Light is generated at the control module and is transmitted by the outgoing optical fiber (20) to the optical transducer (33), which simultaneously varies the relative intensities of two different colors in a dissimilar manner in response to location of a positionable device (34,35) in the optical transducer. The modified intensity is transmitted back to the control module via the return optical fiber (23). The control module (43) measures the intensities of the two returning colors, and then outputs an electrical signal proportional to the intensity ratio for analog applications, or, alternatively, tests the intensity ratio against preselected constants and outputs discrete signals for digital application. The control module can, in addition, incorporate self-monitoring means to determine whether the optical components are functional.

34 Claims, 5 Drawing Sheets

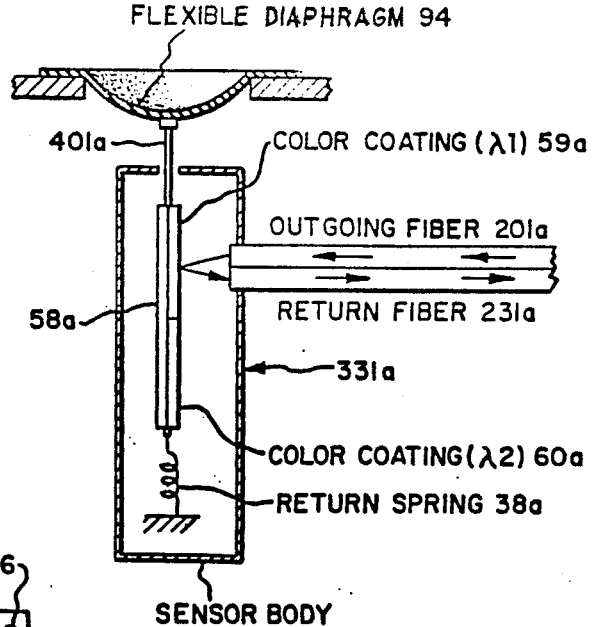
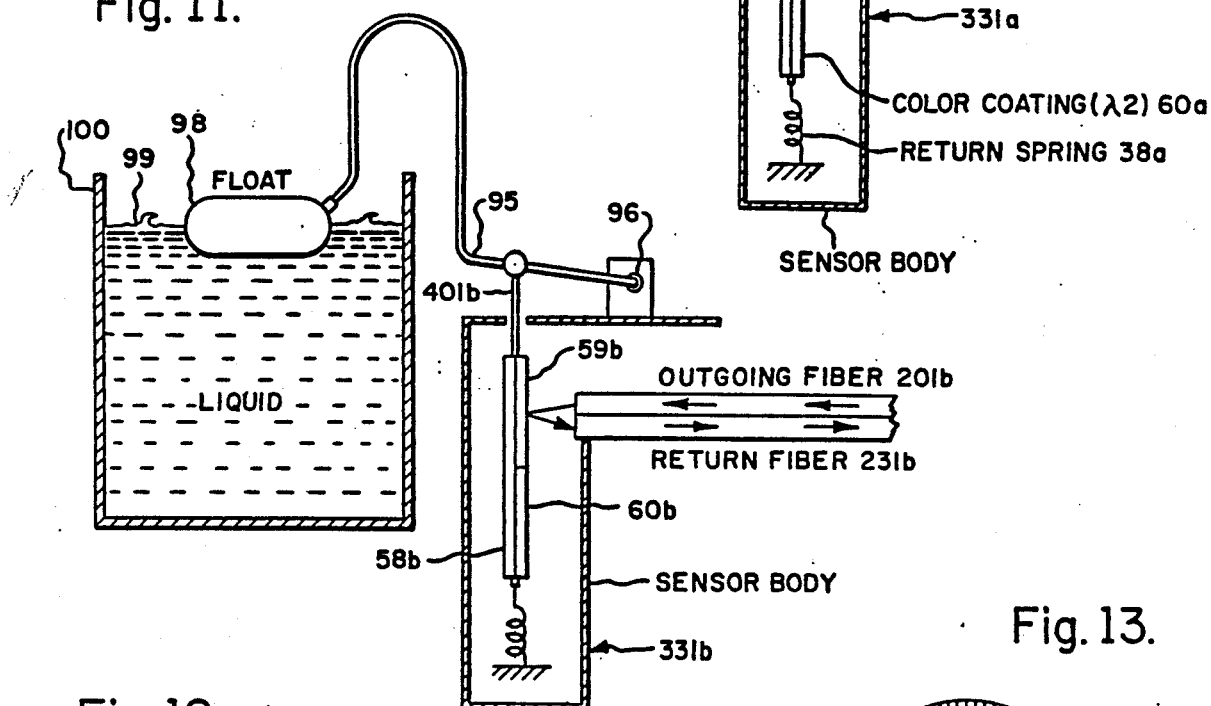
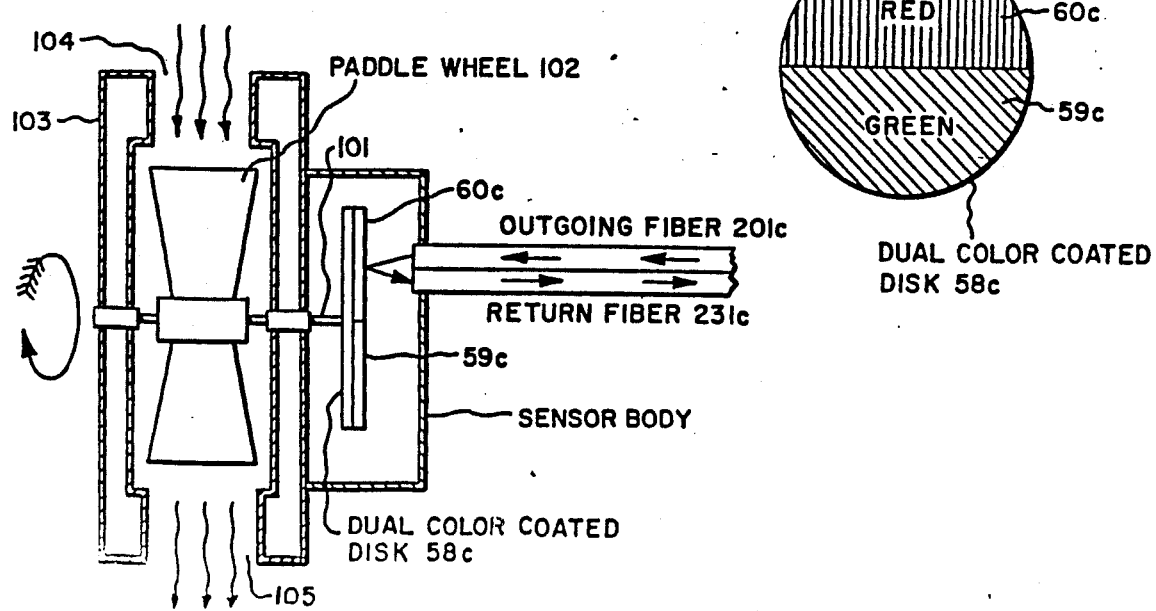

SELF-MONITORING OPTICAL SENSOR HAVING A RATIOMETRIC OUTPUT SIGNAL

CROSS-REFERENCE TO RELATED APPLICATION

This application is a continuation-in-part of pending U.S. patent application Ser. No. 06/915,115, filed Oct. 3, 1986, which is now abandoned for "Fiber Optic Sensor Apparatus".

TECHNICAL FIELD

The present invention relates generally to the field of fiber optics, and, more particularly, to improved fiber optic sensor apparatuses for sensing and/or determining the value of a physical parameter.

BACKGROUND ART

Factory automation requires extremely reliable limit switches and position sensors that are immune to electromagnetic induction. Also, certain industries, such as in the petrochemical and energy fields, require intrinsically-safe switch devices in hazardous locations. Further, there is a major effort to develop aircraft and ships with optical fiber control systems, and the automotive industry is also increasing the use of fiber optics.

Various prior art measuring devices are known for measuring physical parameters as a function of light intensity through the use of transducers. In these devices, light from one or more light sources is transmitted via an outgoing optical fiber to an optical transducer which, in proportion to the parameter to be measured, varies the intensity of light transmitted from the transducer to a detector. Typically, a photo-detection apparatus is used to convert the returned light intensity to a suitable electrical signal(s). It is known that mechanical effects (e.g., bending of the fiber, remating connectors, etc.), as well as environmental effects (e.g., temperature, pressure, etc.), can also affect the intensity of the returned light. Multiple light sources and detectors can be used to compensate for these undesirable effects.

As described in U.S. Pat. No. 4,356,396, lights of two different wavelengths are generated. Two detectors monitor the outgoing light, and two detectors monitor the returning light. One of the lights is reflected back by a mirror positioned ahead of an optical transducer, to provide a reference intensity for comparison and compensation calculation. The transducer acts only upon light of the second wavelength. Thus, it is not possible to make corrections for mechanical or environmental perturbations in the transducer and transmission components.

Optical transducers acting on lights of more than one wavelength are also known. For example, U.S. Pat. Nos. 4,514,860, 4,417,140 and 4,378,496 disclose devices having two light-emitting diodes and associated electronic components in the transducer assembly. A transducer operating without any electric current or voltage is desired, however, to reduce the hazards associated with electrical devices, especially in harsh environments.

Further, multiple wavelengths of light have also been used in prior art transducer assemblies to make multiple measurements. This known technique, as described in U.S. Pat. Nos. 4,523,092, 4,493,995 and 4,281,245, does not compensate for environmental or mechanical perturbations in the transducer. Another example of using two wavelengths is described in U.S. Pat. No. 4,492,860, but only a single fiber is used and polarization is employed to control reflection of the outgoing light into detector apparatus.

Thus, upon information and belief, it has been necessary in the prior art to regularly and carefully inspect the integrity of the optical components to ensure the relevant measurements are not "false" readings, or readings significantly affected by stray light or optical failure. As set forth in detail herebelow, however, one of the primary objects of the present invention is to provide self-monitoring means for determining the optical continuity and light-sealed integrity of the optical path, thereby rendering regular inspection and special testing of the optical components unnecessary.

DISCLOSURE OF THE INVENTION

This invention provides an improved fiber optic sensor apparatus which operates simultaneously upon two different bands of light, and which provides a ratio of detected output light intensities. Such bands of light have spectral distributions centered at two different wavelengths. The magnitude of the ratio is determined by the position of an optical transducer, and, in the preferred embodiment, is utilized by an electronic signal processor. The intensities of the two bands of light may be detected, either by a broad-band detector from wavelength-discriminant light sources, by a wavelength-discriminant detector from a broad-band light source, or by some other means. Thus, the invention contemplates that multiple light sources cooperate with a single detector, or that a single light source cooperates with multiple detectors, or that multiple light sources cooperate with multiple detectors.

According to the invention, an improved fiber optic sensor apparatus includes a first optical transmission path from the light source to the sensor, and a second optical transmission path from the sensor to the detector. The apparatus also includes light generating means (e.g., an LED, a laser diode, or the like) for generating a first light having a spectral distribution centered at a first wavelength ($\lambda_1$), and for generating a second light having a spectral distribution centered at a second wavelength ($\lambda_2$). The first wavelength is different from the second wavelength. These lights may be generated by the same source, or by different source, as desired. Thus, the light sources may be part of a dual-color light generating unit. Light emitted from these light sources may be time-multiplexed and directed as alternate light beams into the input end of an outgoing optical fiber, for transmission therethrough to the transducer.

The transducer is operatively arranged between the output end of the outgoing optical fiber and the input end of the return optical fiber. This transducer includes a positionable member, and an actuator for selectively positioning such member according to the magnitude of a particular parameter-to-be-measured. The transducer simultaneously varies the intensities of the first and second lights in a dissimilar manner (e.g., the intensity of the light of one wavelength will be transmitted relatively unchanged, while the intensity of the light of the other wavelength will be significantly modified), all as a function of the position of the positionable member.

The transducer may be of the transmissive-type having a positionable first optical filter that preferentially transmits the first light while absorbing the second light, and having a positionable second optical filter that preferentially transmits the second light while absorbing the first light, such filters acting in cooperation with one another such that the relative amounts of the first and second lights transmitted into the return optical path are functions of the position of the member. Alternatively, the optical transducer may be of the reflective-type having a positionable first reflector that preferentially reflects the first light while dispersing the second light, and a having a positionable second reflector that preferentially reflects the second light while dispersing the first light, such reflectors acting in cooperation with one another such that the relative intensities of the first and second lights reflected to the detector are functions of the position of the member. The actuator for moving the transducer positionable member is responsive to a command input, which may be controlled by any suitable parameter (i.e., the parameter to be measured), such as linear position, rotary position, temperature, pressure, flow, fluid level, electrical current, electrical voltage, or the like.

The invention also includes a photo-detector operatively arranged at the output end of the second transmissive path for measuring the intensities of such received lights, and for generating voltages in response to such transducer-modified light intensities, thereby quantifying the returned light intensities corresponding to the intensities of the first and second lights. For, example, the photo-detector apparatus may utilize either wavelength dispersion or wavelength filters to produce a first detector voltage proportional to the intensity of the first light, and also to produce a second detector voltage proportional to the intensity of the second light. Another way of quantifying the returned light intensities is to alternately direct the transducer-modified first and second lights to the photo-detector utilizing synchronized time-demultiplexing to produce a first detector voltage proportional to the received intensity of the first light and to produce a second detector voltage proportional to the received intensity of the second light.

The invention also includes a processor, preferably electronic, for determining or monitoring the optical continuity and sealed integrity of the optical path between the light source and the detector, and to indicated a fault in such path in the event of a discontinuity therein or the admission of excess extraneous light thereto. The processor may be responsive to the voltages produced by the photo-detector. In the preferred embodiment, the processor divides the first detector voltage by the second detector voltage to calculate a first ratio, and also produces an output signal proportional to such calculated first ratio for analog operation. For digital operation, the signal processor tests this first ratio against first and second constants. If the ratio is equal to, or greater than, the first constant, the signal output is activated. If the ratio is less than, or equal to, such second constant, the signal output is deactivated.

The invention may also include an output controller having activated and deactivated states responsive to the processor signal output. If the aforementioned first ratio, as tested by the processor, is less than the first constant and also greater than the second constant, then the actuator is considered to be in transition, whereupon the output controller is changed to the state opposite that which it had before the actuator entered the transition zone, producing a "snap action" change of state.

The invention also includes self-monitoring means having activated and deactivated states responsive to a status signal output of the electronic signal processor. The photo-detector produces a third output voltage if either the first or second light is not generated. The detector third output voltage corresponds to the amount of stray light returned through the optical fiber to the detector. The processor divides the sum of the detector first and second output voltages by the detector third output voltage to produce a second ratio. Under normal operation of the invention, this second ratio will be much greater than 2. When one of the optical components of the apparatus is not functional, this second ratio will be approximately 2 or less, and such ratio is then utilized by the signal processor to output a status signal indicating a fault in one of the optical components.

The invention is also self-calibrating and does not require adjustment of the signal processor with changes in cable length to accurately indicate the status of the parameter-to-be-measured. In particular, the typical single-light approach results in a decrease in intensity of reflected light as cable length increases because of line loss and/or transmission loss. Accordingly, the "set point" or "indicator point" of the signal processor has to be modified to allow for such loses, or other environmental perturbations. The measured value of the two-light approach, however, is a ratio of the affected light intensities, and, accordingly, the value of such ratio is independent of line or transmission losses. Although the absolute magnitude of the individual light intensities may vary according to line loss or environmental perturbations, both intensities will vary proportionally and the ratio therebetween will remain substantially constant for a particular parameter value. Thus, it is not necessary to change the "set point" or "indicator point" of the signal processor to account for system or environmental factors.

Throughout the specification, the term "light" is used to denote electromagnetic radiation in the vicinity of the visible spectrum, but it should be understood that the term also includes electromagnetic radiation in the infrared and ultraviolet regions.

One object of the present invention to provide a fiber optic sensor apparatus for discrete or proportional sensing of a physical parameter, such as digital operation for a switch, or analog operation for position measurement or control.

Another object of this invention to provide such fiber optic sensor apparatus which is self-calibrating, and of high resolution so that light sensitivity adjustment is not required.

Another object of this invention to provide such fiber optic sensor apparatus which is self-monitoring to indicate a discontinuity in the optical path, or a malfunction should an optical component fail, without the necessity of regular visual inspections or the use of electronic or other special test equipment.

Still another object of this invention to provide such fiber optic sensor apparatus which is intrinsically safe, since no electrical current or voltage is supplied or generated at the place of position sensing.

These and other objects and advantages will become apparent from the foregoing and ongoing written specification, the drawings, and the appended claims.

BRIEF DESCRIPTION OF THE DRAWINGS

FIG. 10 is a fragmentary schematic view of a first reflective-type sensor, in which the position of the member is responsive to movement of diaphragm.

FIG. 11 is a fragmentary schematic view of a second reflective-type sensor, in which the position of the member is determined by a liquid level.

FIG. 12 is a fragmentary schematic view of a third reflective-type sensor, in which the position of the member is determined by a fluid flow.

FIG. 13 is an elevational view of the dual-color rotary disk shown in FIG. 12.

MODE(S) OF CARRYING OUT THE INVENTION

Figure 1:
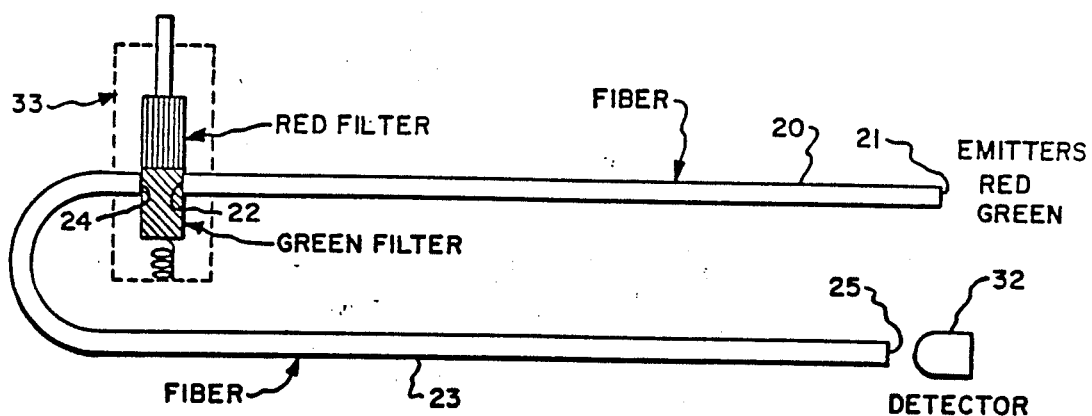
FIG. 1 is a schematic of one embodiment of a transmissive-type optical transducer.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification and are to be considered a portion of the entire written description of this invention. As used in the following description, the terms "horizontal", "vertical", "left", "right", "up" and "down", as well as derivatives thereof (e.g., "horizontally", "rightwardly", "upwardly", etc.) simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
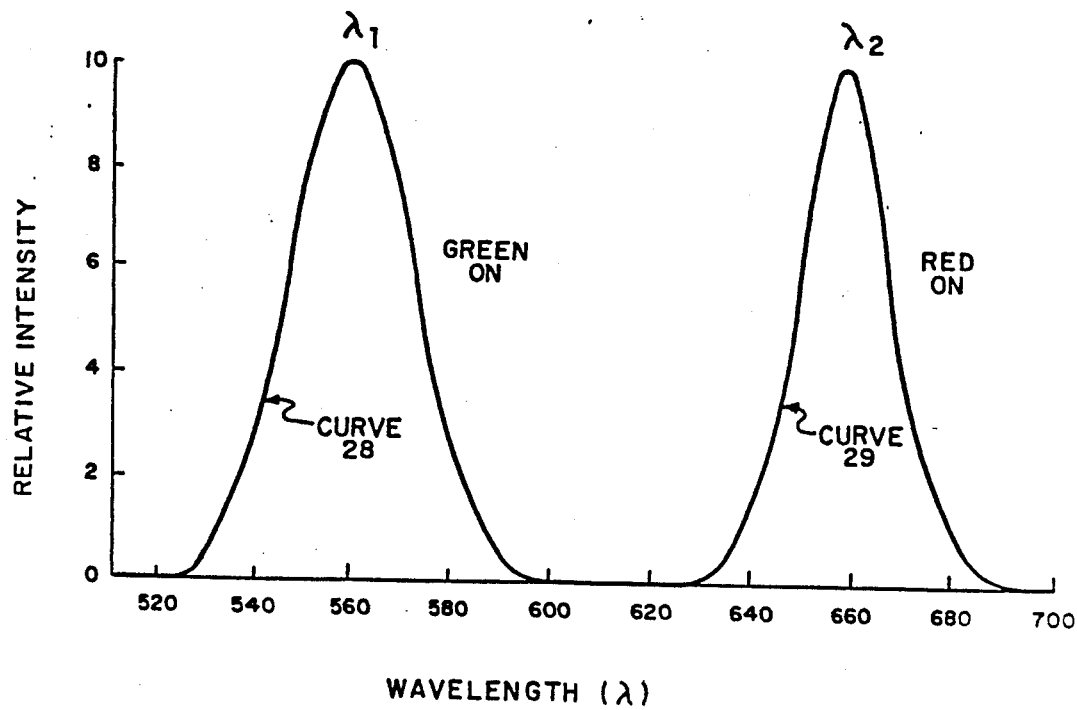
FIG. 2 is a graph illustrating the intensity vs. wavelength characteristics of red and green lights.
Figure 3:
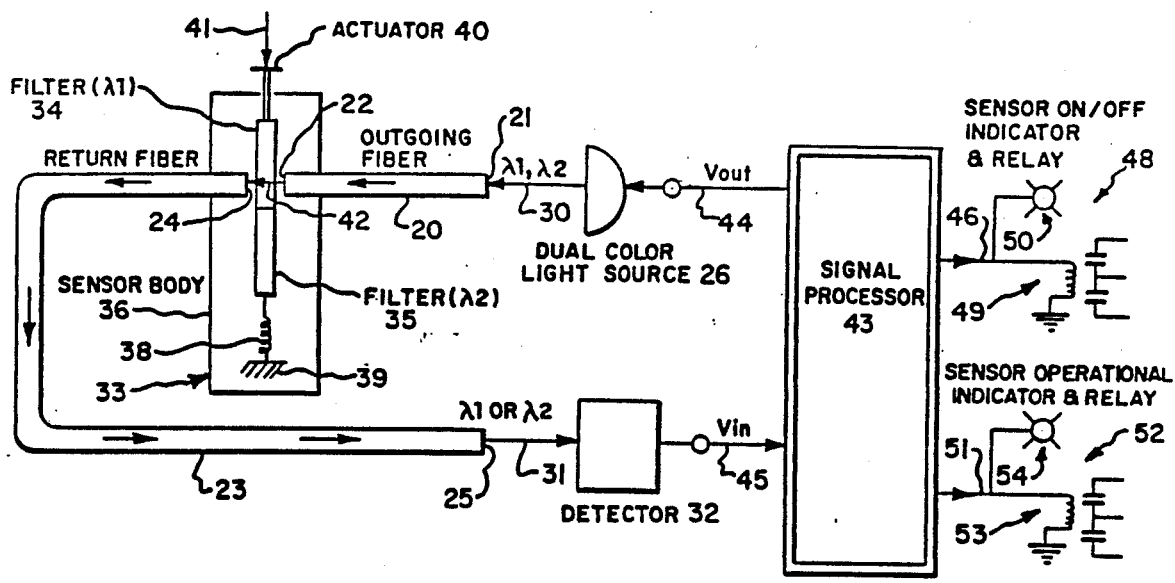
FIG. 3 is a schematic of one preferred embodiment of the present invention, and illustrating the optical transducer part as being of the transmissive-type.

The first preferred embodiment of the inventive fiber optical apparatus, or mode of carrying out the invention, is illustrated in FIGS. 1-3.

Referring to FIGS. 1 and 3, an outgoing optical fiber 20 has a light-receiving input end 21 and a light-emitting output end 22. A return optical fiber 23 has a light-receiving input end 24 and a light-emitting output end 25. Suitable light generating means are provided for relatively generating a first light having a spectral distribution centered at a first wavelength $\lambda_1$, and a second light having a spectral distribution centered at a second wavelength $\lambda_2$. This is shown as a dual-color light source 26 arranged to alternately emit light of two wavelengths $\lambda_1$ and $\lambda_2$. Typically, these may be light-emitting diodes (LED) or lasers, one for emitting a first light (e.g., green), and the other emitting a second light (e.g., red). Any other combination of two wavelength-separated colors may be used.

As depicted in FIG. 2, which plots relative light intensity against wavelength ($\lambda$), the curve 28 for the green color when its LED is energized, has a spectral bandwidth centered about a wavelength $\lambda_1$ of about 560 nanometers (nm), and the curve 29 for the red color when its LED is energized, has a spectral bandwidth centered about a wavelength $\lambda_2$ of about 655 nm. Means are provided for directing the first and second lights generated by source 26 into the input end 21 of outgoing fiber 20, such means being represented by the arrow line 30 in FIG. 3. Light emitted from the output end 25 of fiber 23, as represented by arrow line 31 in FIG. 3, is received by suitable detecting means 32, arranged to detect the intensity of light at such output end.

Suitable optical transducer means, indicated generally at 33, is shown in FIGS. 1 and 3 as operatively interposed between the output end 22 of fiber 20 and the input end 24 of fiber 23. Such transducer means includes a positionable member, and actuator means for moving such member. This member is shown as including a first or upper filter 34, and a second or lower filter 35, these being arranged in end-to-end abutting relation so that the joint therebetween is represented by a line. These two filters, as a unit, are arranged to slide vertically upwardly and downwardly within sensor body 36. As best shown in FIG. 3, this filter unit is constantly biased upwardly by a suitable spring means 38, shown arranged below such unit. The lower end of this spring bears against a suitable support surface 39, and at its upper end acts against the lower end of filter 35. Upper filter 34 is selected such that its spectral bandwidth is centered about 560 nm, and hence will selectively pass green light, absorbing other colors. Lower filter 35 is selected such that its spectral bandwidth is centered about 655 nm to selectively pass red light, absorbing other colors.

The aforementioned actuator means is shown as being a plunger 40 projecting upwardly and outwardly from sensor body 36 through a suitable opening provided therein. The lower end of actuator plunger 40 is suitably connected to the upper end of the filter unit, while its upper end is exposed and adapted to be engaged by a member (not shown), the position of which is to be sensed. Such member is adapted to apply a downward force, represented by arrow line 41 in FIG. 3, against the upper end of actuator plunger 40 to push it further into sensor body 36, thereby moving the filter unit against the opposite urging of the compressible spring 38, until a force balance obtains.

When actuating force 41 does not exist, spring 38 moves the positionable member upwardly, and holds the lower red filter 35 between the opposing ends 22 and 24 of fibers 20 and 23, respectively. However, when an actuating force 41 of sufficient magnitude exists, as depicted in FIG. 3, upper green filter 34 is positioned between fiber ends 22 and 24 so that a beam of light exiting fiber 20, represented by arrow line 42, is directed through upper green filter 34. Obviously, when lower red filter 35 is positioned between filter ends 22 and 24, as not illustrated, the light beam 42 is directed through this filter 35.

Suitable electronic signal processor means, indicated generally at 43, are shown in FIG. 3 as being operatively associated, via arrow line 44, with dual-color light source 26; also, via arrow line 45, with detector 32; further, via arrow line 46, with digital control output state means 48, including output "on/off" relay means 49 and indicator 50; and still further, via arrow line 51, with self-monitoring means 52, including "on/off" relay means 53 and indicator 54. The signal processor 43 may be a single chip microcontroller, the functions of which are described later herein, capable of controlling the sequencing of the red and green light sources by an output voltage $V_{out}$ transmitted through conductor 44, and capable of measuring the input voltage $V_{in}$ transmitted through conductor 45. Voltage $V_{in}$ represents the resultant light amplitude for each wavelength in timed sequence, and controls voltage outputs in conductors 46 and 51 to control the relays and indicators of the output state means 48 and the self-monitoring means 52, respectively. The control is accomplished by means of an internally-stored program, which conforms to an algorithm prepared for time-multiplexed ratiometric light measurement.

The apparatus schematized in FIG. 3 thus includes a discrete position sensor of the transmissive-type. The output state of the means 48 relies on the physical position of switch actuator 40, which is mechanically connected to the pair of optical-filters unit 34,35 located in the path of bi-colored light source fiber 20, and detector fiber 23, both of these fibers 20 and 23 being fixed. The displacement of actuator 40 causes either the green or red filter, as appropriate, to be placed in the path of the light beam 30 emitted from source 26, which has the effect of filtering the light 31 returned to the signal processor. Thus, the relative intensities of the first and second lights returning from sensor 33 to detector 32, are dependent on the physical position of actuator 40.

The second preferred embodiment of the inventive fiber optical apparatus is illustrated in FIGS. 4–7.

Figure 4:
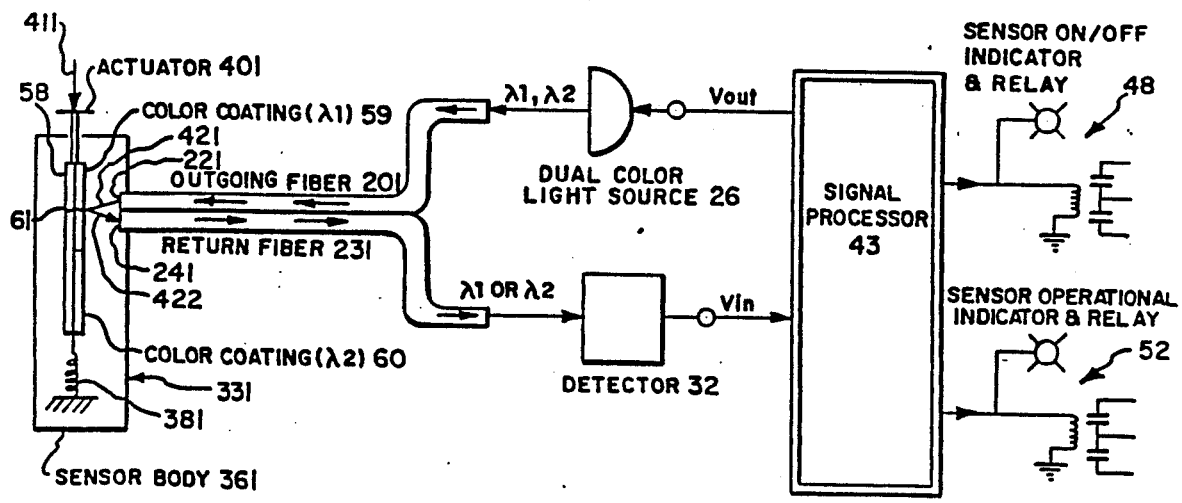
FIG. 4 is a schematic of another preferred embodiment, and illustrating the optical transducer part as being of the reflective-type.

Referring to FIG. 4, the apparatus there shown is generally similar to that shown in FIG. 3, except for a slightly-different construction of optical transducer 331 and the different disposition of the adjacent end portions of the outgoing optical fiber 201 and return optical fiber 231. Otherwise, the balance of the apparatus is similar to that disclosed in FIG. 3, and hence the same reference numerals have been applied in FIG. 4 to the corresponding parts previously described.

The positionable device of the optical transducer 331 includes filters of the reflective-type. Thus, the upper portion of a member 58 is coated with a layer 59 of a suitably-colored material to be reflective of the first light and absorptive of the second light. The lower portion of member 58 is similarly coated with a layer 60 of a suitably-colored material to be absorptive of the first light and reflective of the second light. The opposing ends of layers 59 and 60 are shown as abutting one another. Assuming the first and second lights are the colors green and red, respectively, as considered in the example of FIG. 3, layer 59 is a green coating and layer 60 is a red coating.

Member 58, with its color coatings 59 and 60, resembles the filter unit shown in FIG. 3, in that it has a plunger 401 displaceable rectilinearly in opposite vertical directions against the opposing bias of a lower spring 381. When a downward force, represented by arrow line 411 in FIG. 4, is applied to the upper end of actuator plunger 401, member 58, with its color coatings 59 and 60, can be displaced from its upper position (not illustrated) to its lower position, as illustrated in FIG. 4, until such downward force is opposed by an equal force exerted by further-compressed spring 381.

The end portion of outgoing optical fiber 201 adjacent its output end 221, and the end portion of return optical fiber 231 adjacent its input end 241, are suitably fixed in close side-by-side relation so that both of these fiber ends face toward member 58. An incident light beam, represented by the line 421, emitted from output end 221 of fiber 201, trained on a target spot 61 on member 58, to be reflected, as represented by beam 422, toward the input end 241 of return fiber 231. As illustrated in FIG. 4, incident light beam 421 is shown as impinging on the green coating 59 of member 58, for this particular member position, from which coating the return light beam 422 is reflected. It is evident that if the light-impingement spot 61 is located on the red coating 60, due to member 58 being in its upper position (not shown), the return light beam 422 will be reflected from this red coating 60.

Figure 5:
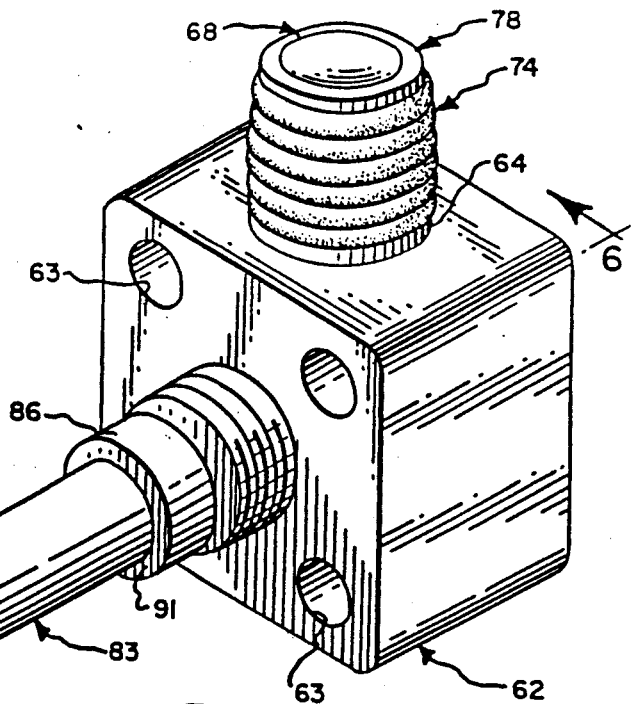
FIG. 5 is an enlarged perspective view of a position-sensing optical fiber transducer of the reflective-type.
Figure 6:
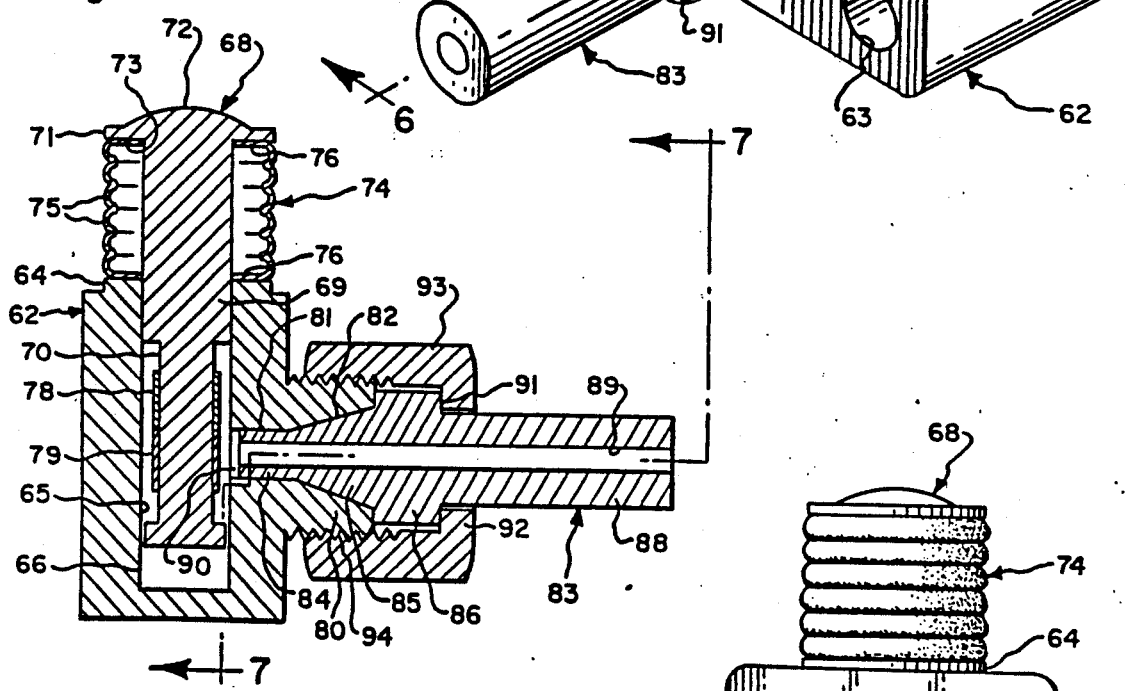
FIG. 6 is a vertical sectional view thereof, taken on line 6—6 of FIG. 5.
Figure 7:
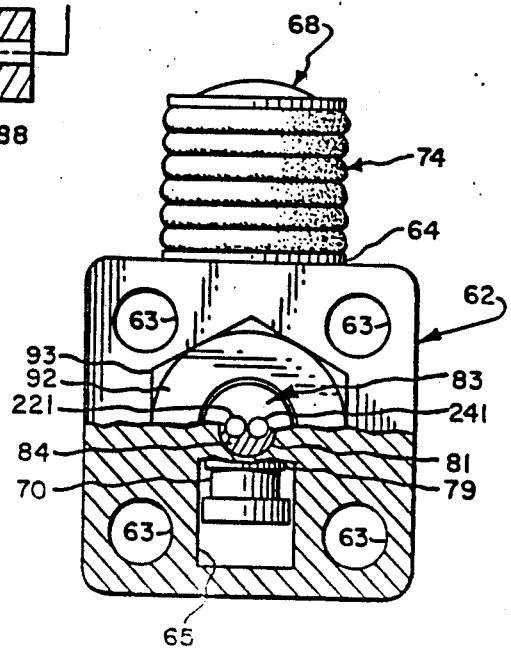
FIG. 7 is a partly-elevational, partly-sectional view thereof, taken on line 7—7 of FIG. 6.

While optical transducer 331 may be of any suitable construction, a preferred construction of the same is illustrated in FIGS. 5–7. As there shown, the transducer includes a block-like body 62 having mounting holes 63 adjacent its corners, four such holes being shown. These holes 63 are adapted to receive suitable fasteners (not shown) for mounting the body on some suitable support (not shown). Body 62 is shown as having an integral flat-surfaced boss 64 terminating in an upwardly-facing annular horizontal surface. A vertically-elongated blind cavity or recess 65 extends downwardly into the main portion of this body from its upper surface, terminating near its lower and closed end. Preferably, this recess 65 is partially defined, in transverse cross-section, by an inwardly-facing cylindrical vertical wall surface 66. Slidably arranged in this recess is a plunger 68 having an upper cylindrical stem portion 69, and having a lower reduced-diameter cylindrical portion 70 adjacent its lower end. Plunger 68 also includes a radially-enlarged head 71, having a domed or rounded upper surface 72 and a downwardly-facing annular horizontal shoulder surface 73.

Figure 8:
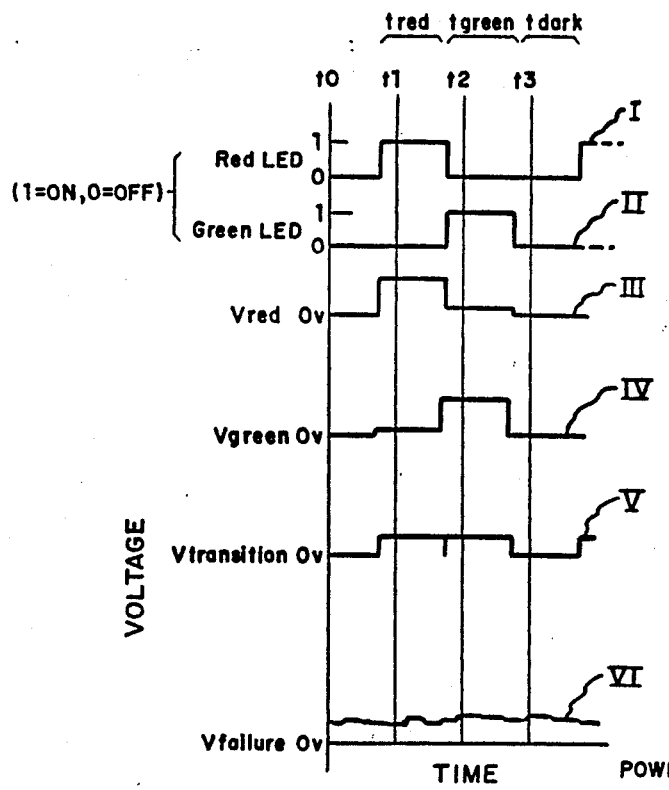
FIG. 8 is a set of graphs of voltage vs. time, and comparing the waveforms produced at various times, under different representative conditions of operation of the inventive apparatus.

Operatively interposed between the opposing faces of body boss 64 and plunger shoulder 73, is a bellows-type spring 74 having a compressible and expandable accordion-like side wall 75 of generally-cylindrical configuration, and having in-turned annular flat flanges 76 at opposite ends of this side wall. Side wall 75 is formed from flexible thin sheet metal, corrugated at vertically-spaced intervals to provide alternate annular folds and furrows. Flanges 76 are suitably sealingly connected to the flat surfaces of body boss 64 and plunger shoulder 73. The folds of side wall 75 flex or bend when the spring 74 is subjected to an axial load, and offer an opposing force. Spring 74 is shown in FIG. 8 in its fully-expanded condition. The spring will yield resistively to shorten its axial length when the load is applied and plunger head 71 is depressed.

Applied to the cylindrical peripheral surface of the upper half of the plunger reduced-diameter section 70 is a circumferential ring 78 of suitable red-colored material. Contiguous to and below this red ring 78 is a circumferential ring 79 of suitable green-colored material, which is applied to the cylindrical peripheral surface of the lower half of the plunger reduced-diameter section 70. These colored rings 78 and 79 may be provided by painting the appropriately-colored material on the surface of this plunger section 70.

Body 62 is also shown as having an integral externally-threaded cylindrical projection 80 which extends horizontally outwardly from one side of this body. Projection 80 has a passage extending therethrough, including an inner cylindrical section 81 and an outer frusto-conical section 82 which flares outwardly toward the outer end of the projection. Partially arranged in this projection passage is a horizontally-elongated connector member 83 for holding optical fibers 201 and 231. This connector 83 includes a leftward outwardly-facing horizontal cylindrical portion 84, a next-rightward leftwardly- and outwardly-facing frusto-conical portion 85, an enlarged outwardly-facing cylindrical intermediate portion 86, and a reduced-diameter cylindrical outer portion 88 continuing rightwardly therefrom. A bore 89 extends longitudinally completely through connector 83. Body inner passage section 81 receives inner connector portion 84, which is shorter in axial length than section 81, so as to leave a gap 90 which opens to body recess 65. The frusto-conical surface of connector tapered portion 85 is complementary to the frusto-conical surface of body tapered passage 82 and is adapted to be seated thereon. The rightwardly-facing annular vertical surface 91 between connector portions 86 and 88 provides a shoulder against which the in-turned flange end 92 of a tubular nut 93 can bear, when this nut is tightened. This nut has a threaded connection 94 with body projection 80.

Connector 83 is adapted to hold optical fibers 201 and 231 in side-by-side relation, with their respective ends 221 and 241 substantially flush with the inner end face of this connector. Gap 90 allows the passage of light between these ends of the fibers and the reflective surface of the colored coatings 78, 79.

Bellows spring 74 is shown in FIGS. 5–7 in its fully-extended condition, whereby the lower green-colored coating 79 is positioned opposite and in spaced relation to ends 221 and 241 of fibers 201 and 231, respectively. If some object (not shown), the position of which is to be sensed, bears downwardly against the domed surface 72 of plunger 68, spring 74 will be compressed, allowing the lower green ring 79 to be displaced from a position opposite fiber ends 221 and 241 and moving the upper red ring 78 into a position opposite these fiber ends. When such object backs away from plunger 68, spring 74 will expand and raise the plunger so that red ring 78 will move out of, and green ring 79 will move into, the operative position opposite fiber ends 221 and 241.

Figure 9:
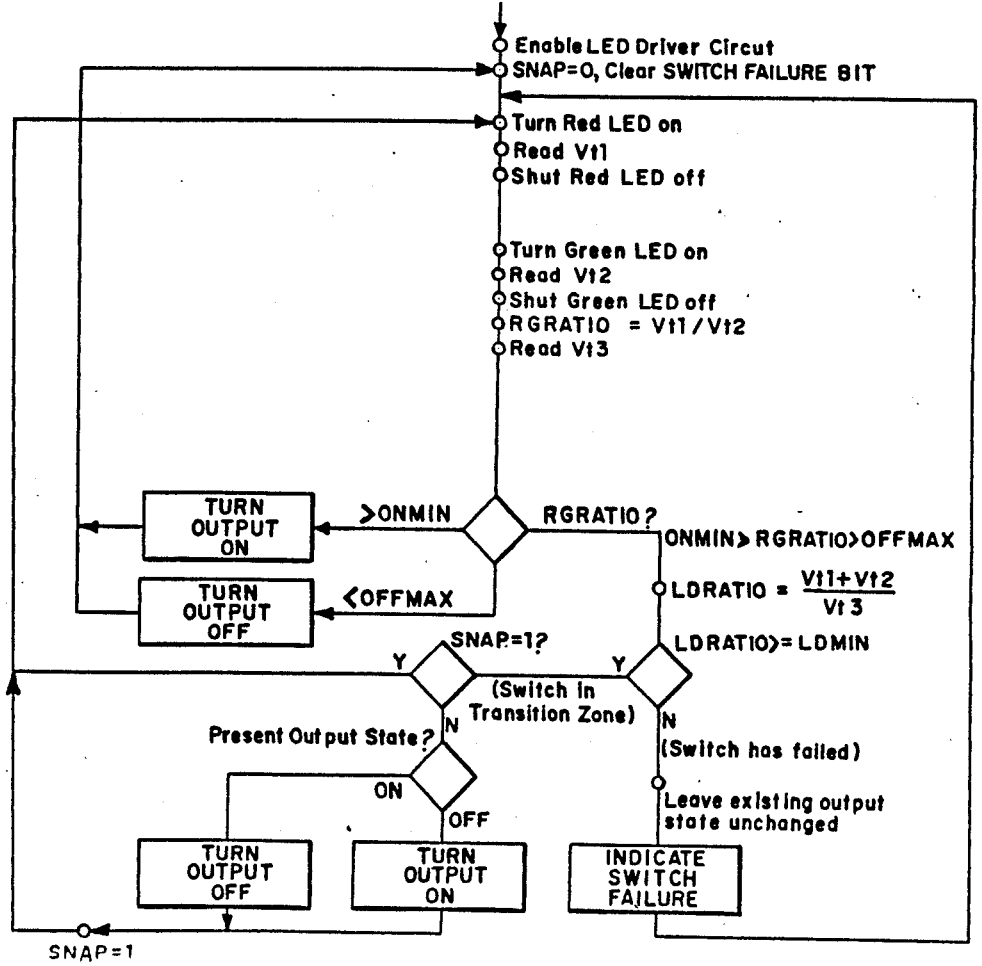
FIG. 9 is a flow chart of the functions performed by the electronic signal processor part of the inventive apparatus, and illustrates a ratiometric time-multiplexed fiber optic discrete position measurement algorithm, including the "snap-action" feature.

The operation of the fiber optic sensor apparatus can be best explained and understood in connection with FIGS. 8 and 9.

Referring first to FIG. 8, voltage is plotted against time. The abscissa indicates four successive times $t_0$, $t_1$, $t_2$ and $t_3$. The time period during which the red LED is energized is indicated by the time interval $t_{red}$. The time period during which the green LED is energized is indicated by the time interval $t_{green}$. The time period during which neither LED is energized is indicated by the time interval $t_{dark}$. The condition of de-energized and energized for the LEDs is represented by 1=energized and 0=de-energized.

Reading from top to bottom, the six voltage waveforms shown in FIG. 8 are designated I, II, III, IV, V and VI, respectively. Wave I represents when the red LED is de-energized and energized. Wave II represents when the green LED is de-energized and energized.

Wave III shows the detector voltages $V_{t1}$, $V_{t2}$ and $V_{t3}$, at times $t_1$, $t_2$ and $t_3$, respectively, when the optical transducer is positioned with the red element in the incident light path (e.g., 42 or 421) emitted from the outgoing optical fiber (e.g., 20 or 201). It will be seen that voltage $V_{t1}$ is greater than voltage $V_{t2}$, and voltage $V_{t3}$ is zero since neither LED is energized.

Wave IV represents the detector voltages $V_{t1}$, $V_{t2}$ and $V_{t3}$, at times $t_1$, $t_2$ and $t_3$, respectively, when the optical transducer is positioned with the green element in the light path (e.g., 42 or 421) emitted from the outgoing optical fiber (e.g, 20 or 201). It will be seen that voltage $V_{t1}$ is less than voltage $V_{t2}$, and voltage $V_{t3}$ is again zero since neither LED is energized.

Thus, at time $t_1$, $V_{t1}$ represents the magnitude of the voltage corresponding to the light transmitted to, and measured at, the detector 26 during the period when the red LED is energized. At time $t_2$, $V_{t2}$ represents the magnitude of the voltage corresponding to the light transmitted to and measured at the detector 26 during the period when the green LED is energized. At time $t_3$, $V_{t3}$ represents the magnitude of the voltage corresponding to the light transmitted to and measured at the detector 26 during the period when both the red and green LEDs are de-energized.

Wave V represents the detector voltage, at times $t_1$, $t_2$ and $t_3$, when the transducer sensor is in transition between red and green, and some of both the red and green elements are positioned in the incident light path (42 or 421) emitted from the outgoing optical fiber (20 or 201). In this condition, voltage $V_{t1}$ is equal to voltage $V_{t2}$, and both are greater than voltage $V_{t3}$, which is zero.

Wave VI represents the detector voltage upon a failure in any one of the optical components (i.e., the light source 26, either optical fiber 20,201 or 23,231, connectors such as 83, optical transducer 33 or 331, and photodetector 32). The detector voltage varies over time, depending on the amount of stray light received by the detector, as in the case of a broken fiber that may be exposed to ambient light.

Referring to FIG. 9, the flow chart there shown depicts the functions performed by the signal processor 43 for controlling a species of the improved sensor apparatus, and also for indicating the operative or failure status of such apparatus.

Upon system power-up, diagnostic checks are first performed to determine that the microcontroller is capable of executing its program. Program memory and input/output circuits are checked, and, if functional, the switch failure bit is cleared, and the corresponding relay output 53 and status indicator 54 are turned "on".

The light source circuit is then enabled, and the red LED 26 is energized. After a short delay, the detector voltage, which corresponds directly to the amount of red light being transmitted through the return optical fiber 231 to the detector, is measured and stored as variable $V_{t1}$. The red LED is then de-energized.

The green LED 26 is energized, and, after a second delay, the detector voltage corresponding to the amount of green light being transmitted through the return optical fiber 231 is measured, and stored as $V_{t2}$. The green LED is now also de-energized.

After a third delay, the detector voltage corresponding to the amount of stray light being transmitted through the return optical fiber 231 is measured and stored as $V_{t3}$. Under normal operation, this light amount is very small in relation to $V_{t1}$ and $V_{t2}$, and is near zero volts.

At this time, $V_{t1}$ is divided by $V_{t2}$, and the result is stored as a variable $RG_{ratio}$, (i.e., "red/green" ratio). This $RG_{ratio}$ is now tested. If greater than or equal to a predetermined constant $ON_{min}$ (i.e., the minimum "red/green" ratio allowed to consider the optical transducer "on"), the sensor is considered "on", and the output relay 49 and "on/off" indicator 50 of the signal processor are energized. If the $RG_{ratio}$ is less than, or equal to, another predetermined constant $OFF_{max}$ (i.e., the maximum "red/green" ratio allowed to consider the optical transducer "off"), the sensor is considered "off", and the output relay 49 and "on/off" indicator 50 of the signal processor is de-energized.

If $RG_{ratio}$ is greater than $OFF_{max}$ but less than $ON_{min}$, a second ratio must be calculated and tested to determine if a switch failure exists, or if the switch is in a transitional state, say, midway between "off" and "on". If midway between states, it is desirable to invert the then-existing present state immediately upon entering this transition zone. This then is considered as "snap action", and provides a distinct, repeatable switching point for each direction of actuator motion. If a failure exists due to a broken optical fiber, connector, actuator, light source, or other optical component, it is desirable to respond to this immediately by freezing or holding the present state output relay 49 and indicator 50, and de-energizing the "status OK" relay 53 and indicator 54.

The difference between the two conditions is decided as follows. A $L/D_{ratio}$ (i.e., "light/dark" ratio) is calculated to be $(V_{t1}+V_{t2})/V_{t3}$. Under normal operation, the sum of $V_{t1}$ and $V_{t2}$ will always be the same (i.e., a relatively large number), with $V_{t3}$ near zero volts. Thus, the $L/D_{ratio}$ will be large, whether the switch is "on", "off", or in transition, and will be a number greater than, say, 10. If a malfunction occurs, such as a cut fiber, $V_{t1}=V_{t2}=V_{t3}$, since the detector then sees only the ambient light level. Thus, the $L/D_{ratio}$ can never be more than $(1+1)/1=2$.

A third selected predetermined constant $L/D_{min}$ (i.e., minimum "light/dark" ratio allowed to consider the optical transducer functional), is assigned a value of, say, 10. If the $L/D_{ratio}$ is equal to or greater than 10, and the "snap action" has not taken place in the previous measurement cycle, the present output relay state is inverted, or snapped. The program then returns to begin a new measurement cycle. If the "snap action" has taken place on the previous cycle, the present output state is held.

If the $L/D_{ratio}$ is less than $L/D_{min}$, the switch is considered as having failed. The outputs of relay 49 and indicator 50 are maintained in their present states, and the "status OK" relay 53 and indicator 54 are de-energized. The program then returns to begin a new measurement cycle.

If the source of the failure is located and repaired, the failure condition will correct itself without requiring any operator action.

Representative applications of the present invention are illustrated in FIGS. 10-13.

In FIG. 10, a reflective-type optical transducer 331a, similar to the one shown at 331 in FIG. 4, is illustrated in fragmentary fashion as being utilized as a pressure sensor. Similar reference numerals, except as distinguished by the suffix "a", are employed in FIG. 10 to designate corresponding parts, portions or surfaces previously described.

The upper end of an actuator rod 401a is shown suitably connected to a flexible diaphragm 94, which is movable by the pressure of fluid confined above this diaphragm. Changes in the pressure of this fluid move, either upwardly or downwardly (as appropriate), the member 58a having a green coating 59a and a red coating 60a. As illustrated in FIG. 10, green coating is in the operative position opposite fibers 201a and 231a, as when a high pressure above the diaphragm which has depressed the coated member and compressed spring 38a. If this fluid pressure decreases sufficiently, the red coating 60a will be shifted upwardly by return spring 39a, into the operative position opposite the fibers. In this manner, transducer 331a serves as a pressure-sensitive switch.

In FIG. 11, a reflective-type optical transducer 331b, similar to the one shown at 331 in FIG. 4, is illustrated as being utilized as a liquid level switch. Similar reference numerals are employed in FIG. 11 as are used in FIG. 4, except for the addition of the suffix "b", to designate corresponding parts, portions or surfaces previously described.

The upper end of an actuator rod 401b is shown as being pivotally connected to a lever 95, intermediate its length. One end of this rod is pivotally mounted on a suitable support, indicated at 96, and the other end carries a float 98. This float determines the level of liquid 99 in a container or tank 100. As the liquid level falls below a predetermined level, lower 95 pivots in a counter-clockwise direction such that the green coating 59b will be positioned opposite the ends of fibers 201b and 231b to, say, open a valve (not shown) for admitting more liquid to tank 100. As the liquid level rises, lever 95 pivots in a clockwise direction so as to position the red coating 60b opposite the ends of fibers 201b and 231b, thereby shutting off the valve.

FIG. 12 depicts a reflective-type optical transducer 331c, similar to the one shown at 331 in FIG. 4, except that green and red color coatings 59c and 60c, respectively, are mounted on a rotatable support member 58c, instead of the rectilinearly-movable members 58, 58a and 58b shown in FIGS. 4, 10 and 11. Similar reference numerals, except as distinguished by the suffix "c", are again employed in FIGS. 12 and 13, to designate corresponding parts, portions or surfaces previously described.

Rotatable member 58c enables the transducer 331c to be used as a flow meter. To this end, member 58c is shown as being a rotatable disk, one half of the face of which is covered with the green coating 59c, and the other half with the red coating 60c, as illustrated in FIG. 13. Disk 58c is fast to a shaft 101 to which a paddle wheel 102 is also secured, this shaft being suitably journalled in a housing 103 having a fluid inlet 104 and a fluid outlet 105. Fluid flowing into this housing through its inlet, and discharged through its outlet, causes the paddle wheel to rotate. This will alternately bring the red- and green-colored semicircular coatings into operative position for impingement by the light beam emitted from outgoing optical fiber 201c, to be reflected back through return optical fiber 231c. By counting the color changes in a given period of time, by suitable means (not shown) incorporated in the signal processor, the flow rate can be determined.

The electronic signal processor or sensor control module 43 can be arranged to handle a plurality of sensors, such as four, and can be located remotely. Typical electrical outputs are +5 volts DC for transistor-transistor logic (TTL), and up to +40 volts DC for relay drives. Two electrical signals and two indicators are provided for each sensor. One signal and indicator match the position of the sensor actuator (i.e., tripped or released). The other signal exists, and indicator remains "on", only as long as the optical circuit is functional. If optical continuity is lost, the "sensor operational" indicator LED is de-energized and the status signal turns "off". The microcontroller-based sensor control module 43 permits additional features to be included, such as recording the number of sensor transitions (which may be helpful in establishing the useful life of what is being controlled), logging the time of each transition, and providing modem interface. With multiple sensors, the microcontroller module permits Boolean logic output combining sensors.

The measurement technique can be extended to more than two positions or parameters by increasing the number of colored zones on the actuator. The signal processing techniques can be applied to multiple light sources and their corresponding colored zones to resolve the position of the actuator within each of the colored zones.

From the foregoing, it will be seen that the disclosed embodiments and applications of the improved fiber optic sensor apparatus achieve the stated objects. Instead of the digital mode of operation of discrete position control, an analog mode of operation for position measurement may be obtained by overlapping dual-colored wedge-shaped filters. Other modifications may occur to those skilled in the art.

While several preferred embodiments of the improved fiber optic sensor apparatus have been shown and described, and certain changes and modifications thereto have been discussed, persons skilled in this art will readily appreciate various additional changes and modifications may be made without departing from the spirit of the invention, as defined and differentiated by the following claims.

We claim:

1. Fiber optic sensor apparatus, comprising:
light generating means for generating a first light having a spectral distribution centered at a first wavelength and for generating a second light having a spectral distribution centered at a second wavelength different from said first wavelength;
first optical transmission means for transmitting said first and second lights from said light generating means to a second location distant from the location of said light generating means;
transducer means operatively arranged at said second location to receive the lights transmitted by said first optical transmission means, said transducer means having a member mounted for movement within a range of movement and operatively arranged in the paths of said first and second lights, the position of said member being determined by the magnitude of a parameter to be measured, said transducer means being operable to modify the intensities of said first and second lights as a function of the position of said member in such a manner that the sum of such modified light intensities will be substantially constant throughout the range of movement of said member;
second optical transmission means for transmitting such modified first and second lights from said transducer means to a third location;
detecting means operatively arranged at said third location to measure the intensities of such modified first and second lights transmitted by said second optical transmission means and to generate signals as a function of such measured intensities; and
processing means operatively arranged to determine the optical continuity and sealed integrity of the optical path between said light generating means and said detector, and to indicate a fault in said path in the event of either a discontinuity in said path or the admission of extraneous light to said path.

2. The apparatus as set forth in claim 1 wherein said first optical transmission means is an optical fiber.

3. The apparatus as set forth in claim 1 wherein said second optical transmission means is an optical fiber.

4. The apparatus as set forth in claim 1 wherein said first optical transmission means is a first optical fiber, and wherein said second optical transmission means is a second optical fiber.

5. The apparatus as set forth in to claim 1 wherein said transducer means is of the transmissive-type.

6. The apparatus as set forth in claim 5 wherein said member includes a first optical filter that only transmits said first light and a second optical filter that only transmits said second light, said first and second optical filters being arranged so that the relative intensities of said first and second lights transmitted to said second optical transmission means are dependent upon the position of said member.

7. The apparatus as set forth in claim 6 wherein said detecting means produces a first detector voltage proportional to the measured intensity of said first light and produces a second detector voltage proportional to the measured intensity of said second light.

8. The apparatus as set forth in claim 1 wherein said transducer means is of the reflective-type.

9. The apparatus as set forth in claim 8 wherein said member includes a first reflector which only reflects said first light and a second reflector that only reflects said second light, said reflectors being arranged so that the relative amounts of said first and second lights transmitted to said second optical transmissive means are dependent upon the position of said member.

10. The apparatus as set forth in claim 9 wherein said detecting means produces a first detector voltage proportional to the measured intensity of said first light and produces a second detector voltage proportional to the measured intensity of said second light.

11. The apparatus as set forth in claim 1 wherein said first and second lights are time-multiplexed in said first optical transmission means, and wherein said detecting means utilizes the sequence of such time-multiplexing to produce and distinguish a first detector voltage proportional to the measured intensity of said first light and to produce and distinguish a second detector voltage proportional to the measured intensity of said second light.

12. The apparatus as set forth in claim 7 wherein said processing means divides said first detector voltage by said second detector voltage to calculate a first ratio, and produces an output signal having a magnitude proportional to the magnitude of said first ratio.

13. The apparatus as set forth in claim 12 wherein said processing means compares said calculated first ratio with predetermined first constant and second constants, and if said first ratio is greater than, or equal to, said first constant, said output signal is provided, and if said first ratio is less than, or equal to, said second constant, then said output signal is not provided.

14. The apparatus as set forth in claim 13 and further comprising output control means having activated and deactivated states responsive to said output signal, wherein if said processing means determines that said calculated first ratio is less than said first constant and also greater than said second constant, then said actuator is considered to be in transition and said output control means is changed to the state opposite that which it had before the actuator entered the transition zone, thereby producing a "snap action" of the change of state.

15. The apparatus as set forth in claim 14 and further comprising self-monitoring means having activated and deactivated states responsive to a status signal, wherein said detecting means produces a third detector output voltage corresponding to the intensity of ambient light received by said detecting means when neither said first or said second light generating means is operative, said processing means dividing the sum of said first and second detector output voltages by said third detector output voltage to produce a second ratio which, under normal operation, will be much greater than 2, and will be approximately 2 or less when any of the optical components of the apparatus is not functional, and wherein said second ratio is utilized by said processing means to output said status signal indicating a fault in one of such optical components.

16. The apparatus as set forth in claim 1 wherein more than two light sources are used to determine the location of said member within multiple zones over the range of travel of said member.

17. The apparatus as set forth in claim 10 wherein said processing means divides said first detector voltage by said second detector voltage to calculate a first ratio, and produces an output signal having a magnitude proportional to the magnitude of said first ratio.

18. Fiber optic sensor apparatus, comprising:
a light source;
first optical transmission means for transmitting light from said source to a remote location;
optical transducer means arranged to receive light transmitted by said first optical transmission means, said transducer means having a member mounted for movement within a range of movement and operatively arranged in the path of said light, the position of said member being determined by the magnitude of a parameter to be sensed, said member having wavelength-responsive means for modifying the intensities of two different bands of light centered at two different wavelengths as a function of the position of said member in such a manner that the sum of such modified light intensities will be substantially constant throughout the entire range of movement of said member;
detecting means operatively arranged to receive such light bands from said second optical transmission means, to measure the intensities of said light bands, and to measure the intensity of ambient light received from said second optical transmission means when no light is transmitted from said source; and
processing means operatively arranged to determine the continuity and sealed integrity of the optical path between said source and said detecting means, and to indicate a fault in said path in the event of either a discontinuity in said path or the admission of extraneous light to said path.

19. The apparatus as set forth in claim 18 wherein said first optical transmission means is an optical fiber.

20. The apparatus as set forth in claim 18 wherein said second optical transmission means is an optical fiber.

21. The apparatus as set forth in claim 18 wherein said first optical transmission means is a first optical fiber, and wherein said second optical transmission means is a second optical fiber.

22. The apparatus as set forth in claim 18 wherein said optical transducer means is of the transmissive-type, wherein said wavelength-responsive means includes a first optical filter that only transmits light of one of said bands and a second optical filter that only transmits light of the other of said bands, said optical filters being arranged so that the relative amounts of such transmitted lights are dependent upon the position of said member, wherein said detecting means generates signals as a function of such measured intensities, wherein processing means divides a first detector output signal for the light of one of said bands by a second detector output signal for the light of the other of said bands to produce a first ratio, and also produces another output signal proportional to said first ratio, and further comprising self-monitoring means having activated and deactivated states responsive to a status signal, wherein said detecting means produces a third output signal, proportional to the ambient light transmitted when no light is generated from said source, said signal processing means dividing the sum of said first and second detector output signals by said third detector output signal to produce a second ratio which, under normal operation, will be much greater than 2, and will be 2 or less in the event of an optical discontinuity or the admission of excess extraneous lights to said path, and said second ratio is utilized by said signal processor means to output said status signal indicating a fault in one of such optical components.

23. The apparatus as set forth in claim 18 wherein said optical transducer means is of the reflective-type, wherein said member includes a first reflector that only reflects light of one of said bands and a second reflector that only reflects light of the other of said bands, said reflectors being arranged so that the relative intensities of said bands are dependent upon the position of said member, wherein said detecting means generates first and second output signals as functions of the reflected intensities of said first and second lights, said processing means dividing a first output signal for the light of one of said bands by said second output signal for the light of the other of said bands to produce a first ratio, and also produces another output signal proportional to said first ratio, and further comprises self-monitoring means having activated and deactivated states responsive to a status signal, wherein said detecting means produces a third output signal proportional to the ambient light received from said second optical transmission means when no light is generated by said source, said processing means dividing the sum of said first and second output signals by said third output signal to produce a second ratio which, under normal operation, will be much greater than 2, and will be approximately 2 or less when any of the components of the apparatus is not functional, and wherein said second ratio is utilized by said signal processor means to output said status signal indicating a fault in one of such optical components.

24. An optical transducer adapted to be associated with a source of light generating at least two bands of light of different wavelengths, comprising:
a body provided with an internal chamber;

a member movably mounted on said body, said member having one portion arranged within said body and being movable relative to said body throughout a range of movement in response to a parameter to be measured;

first transmission means for transmitting said bands of light from said source into said chamber;

modifying means mounted on said member one portion for continuously modifying the intensities of said bands of light as a function of the position of said member relative to said body in such a manner that the sum of such modified intensities will be substantially constant throughout said range of movement of said member; and second transmission means for transmitting such modified bands of light from said chamber;

whereby the relative modified intensities of said bands of light will indicate the position of said member relative to said body.

25. An optical transducer as set forth in claim 24, wherein said modifying means is of the transmissive-type, and has a first filter for permitting the transmission of the light of only one of said wavelengths, and has a second filter for permitting the transmission of the light of only the other of said wavelengths.

26. An optical transducer as set forth in claim 24, wherein said modifying means is of the reflective-type, and has a first reflector for reflecting the light of only one of said wavelengths, and has a second filter for reflecting the light of only the other of said wavelengths.

27. An optical transducer as set forth in claim 24, wherein said member is slidably mounted on said body.

28. An optical transducer as set forth in claim 24, and further comprising biasing means for urging said member to move to a predetermined position relative to said body.

29. An optical transducer as set forth in claim 28 wherein said biasing means is a bellows spring.

30. Fiber optic sensor apparatus, comprising:
light generating means for generating a first light having a spectral distribution centered at a first wavelength and for generating a second light having a spectral distribution centered at a second wavelength different from said first wavelength;

first optical transmission means for transmitting said first and second lights from said light generating means to a second location distant from the location of said light generating means;

transducer means operatively arranged at said second location to receive the lights transmitted by said first optical transmission means, said transducer means having a movable member operatively arranged in the paths of said first and second lights, the position of said member being determined by the magnitude of a parameter to be measured, said transducer means being operable to modify the intensities of such received first and second lights as a function of the position of said member in such a manner that the sum of such modified light intensities will be substantially constant throughout the entire range of movement of said member;

second optical transmission means for transmitting such modified first and second lights from said transducer means to a third location; and detecting means operatively arranged at said third location to measure the intensities of such modified first and second lights transmitted by said second optical transmission means and to generate signals as a function of such measured intensities.

31. Fiber optic sensor apparatus, comprising:
a light source;
first optical transmission means for transmitting light from said source to a remote location;

optical transducer means arranged to receive light transmitted by said first optical transmission means, said transducer means having a member mounted for movement within a range of movement and operatively arranged in the path of said light, the position of said member being determined by the magnitude of a parameter to be sensed, said member having wavelength-responsive means for simultaneously modifying the intensities of two different bands of light centered at two different wavelengths as a function of the position of said member in such a manner that the sum of such modified light intensities will be substantially constant throughout the entire range of movement of said member;

second optical transmission means for transmitting such modified light bands from said transducer to another location; and detecting means operatively arranged to receive such light bands from said second optical transmission means, to measure the intensities of said light bands, and to measure the intensity of the ambient light received from said second optical transmission means when no light is transmitted from said source.

32. The method of optically sensing the position of a member for movement within a range of movement relative to a body, comprising the steps of:
generating two bands of light of different wavelengths;
transmitting such generated lights to a transducer;
modifying the intensities of such lights in said transducer as a function of the position of said member in such a manner that the modified intensity of at least one of said lights will indicate the position of said member relative to said body and the sum of such modified light intensities will remain substantially constant independent of the position of said member relative to said body within said range of movement; and
detecting such modified light intensities.

33. The method as set forth in claim 32, and further comprising the additional step of:
indicating the position of said member relative to said body as a function of the ratio of said modified light intensities.

34. The method as set forth in claim 32, and further comprising the additional step of:
monitoring the integrity of said optical path as a function of the sum of said modified light intensities.

* * * * *

UNITED STATES PATENT AND TRADEMARK OFFICE
CERTIFICATE OF CORRECTION

PATENT NO. : 4,947,036
DATED : August 7, 1990
INVENTOR(S) : Joseph D. Pokorski, et. al.

It is certified that error appears in the above-indentified patent and that said Letters Patent is hereby corrected as shown below:

Column 15, between lines 52 and 53, the following clause should be inserted:

"second optical transmission means for transmitting such modified light intensities rom said transducer to another location;".

Signed and Sealed this

Twenty-sixth Day of April, 1994

Attest:

BRUCE LEHMAN

Attesting Officer

*Commissioner of Patents and Trademarks*